United States Patent [19]

Mawatari

[11] Patent Number: 4,796,105

[45] Date of Patent: Jan. 3, 1989

[54] HELICAL SCAN TYPE MAGNETIC RECORDING AND REPRODUCING APPARATUS FOR RECORDING AND REPRODUCING DIGITAL SIGNAL

[75] Inventor: Akinori Mawatari, Kodaira, Japan

[73] Assignee: Teac Corporation, Japan

[21] Appl. No.: 13,129

[22] Filed: Feb. 10, 1987

[30] Foreign Application Priority Data

Feb. 21, 1986 [JP] Japan ................................. 61-37890

[51] Int. Cl.⁴ ....................... G11B 27/02; G11B 15/14
[52] U.S. Cl. ...................................... 360/14.1; 360/64
[58] Field of Search ...................... 360/13, 14.1, 64, 32

[56] References Cited

U.S. PATENT DOCUMENTS 3,352,977 11/1967 Shashoua ............................... 360/64
4,642,711 2/1987 Yumoki et al. ......................... 360/64

FOREIGN PATENT DOCUMENTS

60-224107 11/1985 Japan .

Primary Examiner—Vincent P. Canney
Attorney, Agent, or Firm—Ladas & Parry

[57] ABSTRACT

A helical scan type magnetic recording and reproducing apparatus comprises first and second rotary heads which are mounted on a rotary drum at positions separated by an angle of approximately 180° on a rotational plane of the rotary drum and have mutually different height positions along an axial direction of the rotary drum so that a track position on the magnetic tape scanned by the first rotary head is scanned by the second rotary head a predetermined time after the track position is scanned by the first rotary head, where the predetermined time corresponds to a rotary angle $540° + 360° \times m$ of the rotary drum and $m = 0$, 1 or 2.

6 Claims, 5 Drawing Sheets

HELICAL SCAN TYPE MAGNETIC RECORDING AND REPRODUCING APPARATUS FOR RECORDING AND REPRODUCING DIGITAL SIGNAL

BACKGROUND OF THE INVENTION

The present invention generally relates to helical scan type magnetic recording and reproducing apparatuses, and more particularly to a helical scan type magnetic recording and reproducing apparatus which can satisfactorily reproduce a recorded signal from a magnetic tape for monitoring purposes while recording a signal on the magnetic tape and satisfactorily carry out an editing operation such as an insert recording while reproducing a recorded signal from the magnetic tape.

Conventionally, there is a helical scan type magnetic recording and reproducing apparatus for recording and reproducing video and/or audio signals on and from a magnetic tape by use of rotary heads which form tracks obliquely to a longitudinal direction of the magnetic tape. As will be described later on in the present specification in conjunction with a drawing, the conventional apparatus comprises a first pair of rotary heads mounted at mutually opposing positions on a rotary drum and a second pair of rotary heads mounted at mutually opposing positions on the rotary drum. The first pair of rotary heads respectively lead the second pair of rotary heads by an angle less than 90° along a rotating direction of the rotary drum. The first and second pairs of rotary heads are all mounted at the same height position along an axial direction of the rotary drum. A magnetic tape is wrapped obliquely around a peripheral surface of the rotary drum for an angular range of approximately 180° and is transported in a predetermined direction. When reproducing recorded signals for monitoring purposes while recording signals on the magnetic tape, the second pair of rotary heads scan over the tracks formed by the first pair of rotary heads so as to reproduce the recorded signals.

However, according to the conventional apparatus, it is difficult to carry out an editing operation such as an insert recording while reproducing recorded signals from the magnetic tape. Especially in the case of a pingpong operation in which a first rotary head reproduces a recorded signal from the magnetic tape and a second rotary head records on the magnetic tape a signal which is obtained by subjecting the reproduced signal from the first rotary head to a predetermined signal processing, a time interval between a time when the first rotary head finishes reproducing the recorded signal from a predetermined track on the magnetic tape and a time when the second rotary head starts to record on the predetermined track the signal which is obtained by subjecting the reproduced signal from the first rotary head to the predetermined signal processing is extremely short and is insufficient for carrying out the predetermined signal processing. In addition, when recording a digital signal which is reproduced from the magnetic tape, it is necessary to reserve a time it takes to decode and demodulate the reproduced digital signal and a time it takes to encode and modulate the digital signal which is to be recorded. For this reason, it is impossible to carry out an editing operation such as the pingpong operation in the conventional apparatus.

SUMMARY OF THE INVENTION

Accordingly, it is a general object of the present invention to provide a novel and useful helical scan type magnetic recording and reproducing apparatus in which the problems described heretofore are eliminated.

Another and more specific object of the present invention is to provide a helical scan type magnetic recording and reproducing apparatus comprising first and second rotary heads which are mounted on a rotary drum at positions separated by an angle of approximately 180° on a rotational plane of the rotary drum and have mutually different height positions along an axial direction of the rotary drum so that a track position on the magnetic tape scanned by the first rotary head is scanned by the second rotary head a predetermined time after the track position is scanned by the first rotary head, where the predetermined time corresponds to a rotary angle $540° + 360° \times m$ of the rotary drum and $m = 0$, 1 or 2. According to the apparatus of the present invention, the track position scanned by the first rotary head is accurately scanned by the second rotary head after the predetermined time corresponding to the rotary angle $540° + 360° \times m$ of the rotary drum, it is possible to carry out an editing operation such as an insert recording with ease. In addition, even in the case where a digital signal is to be recorded and reproduced, it is possible to carry out a pingpong operation with ease because the predetermined time is set to a time interval which is required between a time when the first rotary head finishes reproducing a recorded signal from a predetermined track on the magnetic tape and a time when the second rotary head starts to record on the predetermined track a signal which is obtained by subjecting the reproduced signal from the first rotary head to a predetermined signal processing.

Other objects and further features of the present invention will be apparent from the following detailed description when read in conjunction with the accompanying drawings.

BRIEF DESCRIPTION OF THE DRAWINGS

FIGS. 5(A) through 5(J) are timing charts for explaining the operation of the apparatus shown in FIG. 4 during a normal recording mode;

DETAILED DESCRIPTION

Figure 1:
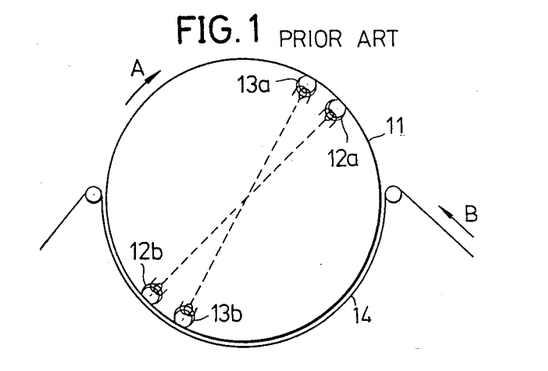
FIG. 1 is a plan view showing a drum portion of an example of the conventional helical scan type magnetic recording and reproducing apparatus.

FIG. 1 shows a drum portion of an example of the conventional recording and reproducing apparatus. A pair of mutually opposing rotary heads 12a and 12b and another pair of mutually opposing rotary heads 13a and 13b are mounted on a rotary drum 11 so that the heads 13a and 13b respectively trail the heads 12a and 12b by an angle less than 90° along a rotating direction A of the rotary drum 11. The heads 12a, 12b, 13a and 13b are all mounted at the same height position along an axial direction of the rotary drum 11. A magnetic tape 14 is wrapped obliquely around a peripheral surface of the rotary drum 11 for an angular range of approximately 180° and is transported in a predetermined direction B. When reproducing recorded signals for monitoring purposes while recording signals on the magnetic tape, the heads 13a and 13b scan over the tracks formed by the heads 12a and 12b so as to reproduce the recorded signals.

However, according to this conventional apparatus, it is difficult to carry out an editing operation such as an insert recording while reproducing the recorded signals from the tape 14. Especially in the case of a pingpong operation in which the head 12a or 12b reproduces a recorded signal from the tape 14 and the head 13a or 13b records on the tape 14 a signal which is obtained by subjecting the reproduced signal from the head 12a or 12b to a predetermined signal processing, a time interval between a time when the head 12a or 12b finishes reproducing the recorded signal from a predetermined track on the tape 14 and a time when the head 13a or 13b starts to record on the predetermined track the signal which is obtained by subjecting the reproduced signal from the head 12a or 12b to the predetermined signal processing is extremely short and is insufficient for carrying out the predetermined signal processing. In addition, when recording a digital signal which is reproduced from the tape 14, it is necessary to reserve a time it takes to decode and demodulate the reproduced digital signal and a time it takes to encode and modulate the digital signal which is to be recorded. For this reason, it is impossible to carry out an editing operation such as the piggpong operation in the conventional apparatus.

Accordingly, the present invention eliminates the problems of the conventional apparatus by providing a recording and reproducing apparatus which comprises first and second rotary heads mounted on a rotary drum at positions separated by an angle of approximately 180° on a rotational plane of the rotary drum and having mutually different height positions along an axial direction of the rotary drum so that a track position on the magnetic tape scanned by the first rotary head is scanned by the second rotary head a predetermined time after the track position is scanned by the first rotary head, where the predetermined time corresponds to a rotary angle 540°+360°×m of the rotary drum and m=0, 1 or 2.

Figure 2A:
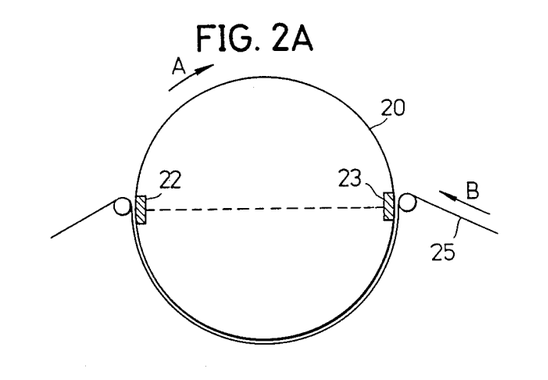
FIGS. 2A and 2B are a plan view and a side view respectively showing a drum portion of a first embodiment of the helical scan type magnetic recording and reproducing apparatus according to the present invention.
Figure 2B:
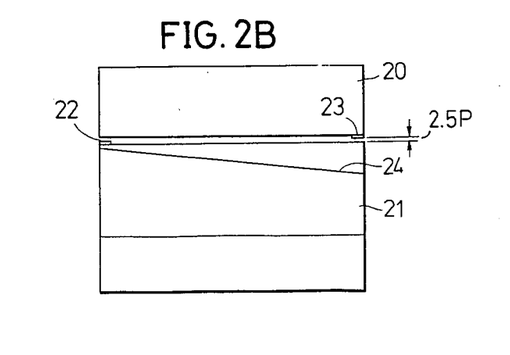

FIGS. 2A and 2B are a plan view and a side view respectively showing a drum portion of a first embodiment of the recording and reproducing apparatus according to the present invention. A drum assembly comprises a rotary drum 20 and a stationary drum 21, and rotary magnetic heads 22 and 23 are mounted at mutually opposing positions on the rotary drum 20 which rotates in the rotating direction A. A tape guide 24 is formed on the periphery of the stationary drum 21, and a lower edge of a magnetic tape 25 which is wrapped obliquely around the peripheral surface of the drum assembly for an angular range of approximately 180° is guided as the tape 25 is transported in the predetermined direction B. As shown exaggeratedly in FIG. 2B, the height position of the head 23 on the rotary drum 20 is higher than the height position of the head 22 by a distance of 2.5 track pitches (2.5P), for example, along the axial direction of the rotary drum 20.

Figure 3:
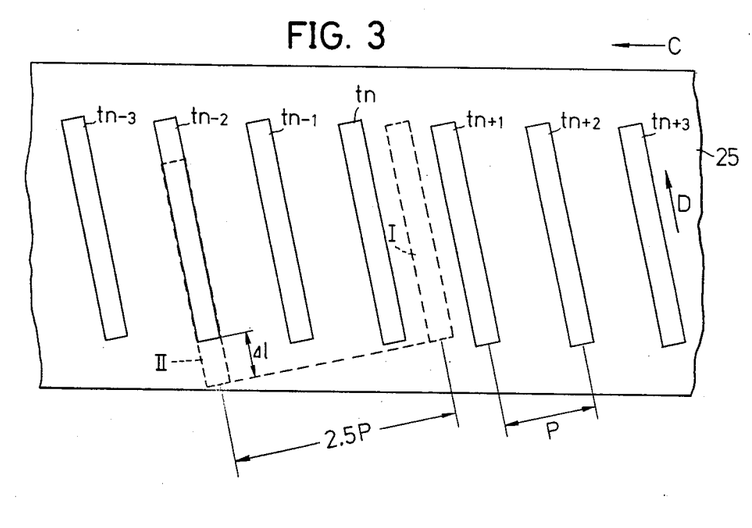
FIG. 3 shows a track pattern formed on a magnetic tape by the recording and reproducing apparatus of the present invention.

Digital signals are recorded on the tape 25 when the tape 25 is transported in the direction B and the rotary drum 20 rotates in the direction A. For this reason, tracks $t_{n-3}, t_{n-2}, \ldots, t_{n+3}$ indicated by solid lines in FIG. 3 are formed in this sequence when the recording is carried out by the head 22. In FIG. 3, the tape 25 is transported in a direction C and each track is formed in a direction D. A track pitch P is a distance between center lines of two mutually adjacent tracks such as the tracks $t_{n+1}$ and $t_{n+2}$.

In FIG. 2B, if the heads 22 and 23 were mounted at the same height position on the rotary drum 20, the head 23 would scan a position indicated by a phantom line I in FIG. 3 immediately after the head 22 scans the track $t_n$. However, since the height position of the head 23 is 2.5 track pitches (2.5P) higher than the height position of the head 22 along the axial direction of the rotary drum 20 in the present embodiment, the head 23 scans a position indicated by a phantom line II overlapping the track $t_{n-2}$ in FIG. 3 immediately after the head 22 scans the track $t_n$. However, due to the difference in the height positions of the heads 22 and 23, an error $\Delta l$ is introduced between the start of the track $t_{n-2}$ and the start of the track indicated by the phantom line II.

In the present embodiment, it will be assumed that multi-channel digital audio signals are recorded and reproduced on and from the tape 25. In this case, when reproducing a digital audio signal from the tape and also recording on the tape a digital audio signal which is obtained by subjecting the reproduced digital audio signal to a predetermined signal processing, a predetermined time must be provided between a time when one head finishes reproducing the recorded digital audio signal from the tape and a time when the other head starts to record the processed digital signal on the tape. In the present invention, this predetermined time is selected to correspond to a rotating angle $\theta_T$ of the rotary drum 20 for the following reasons.

Firstly, by taking into consideration the compensation of jitter included in the reproduced signal and the complexity of the decoding process, a time corresponding to a minimum of 180° rotating angle of the rotary drum 20 is required to decode the reproduced signal. There is no limit to a maximum time required for the decoding, but it is desirable from the point of view of processing efficiency that the maximum time is 360° or less in rotating angle of the rotary drum 20.

Secondly, a time delay corresponding to 0° to 180° rotating angle of the rotary drum 20 is required to match the timings of the multi-channel signals which are time-divisionally recorded on the tape. When the signals of four channels are recorded on the tape, the signals are successively recorded for every 45° rotating angle of the rotary drum 20. For this reason, in order to record sampled data related to the same time on the same track, it is necessary to delay the signals at the time of the recording and at the time of the reproduction so as to match the phases, and a total delay time at the time of the recording and at the time of the reproduction is 135° rotating angle of the rotary drum 20 at a minimum.

However, the delay for matching the phase is unnecessary (that is, 0° rotating angle of the rotary drum 20) when there is no need to record the sampled data related to the same time on the same track.

Thirdly, when mixing the reproduced audio signal with an input audio signal, for eaample, 360° rotating angle of the rotary drum 20 is required to digitize the mixed audio signal. In other words, since real time data amounting to 360° rotating angle of the rotary drum 20 are time-base-compressed (time-base-compressed to 45° rotating angle of the rotary drum 20 in the case of four channels) before recording, 360° rotating angle of the rotary drum 20 is required to carry out punch in/out operations in real time while monitoring the reproduced signal.

Fourthly, 0° to 360° rotating angle of the rotary drum 20 is required to encode the digital signal which is to be recorded. The time required to carry out the encoding may be asuumed to be zero (0°), but several tens of degrees rotating angle of the rotary drum 20 is desirable when designing the hardware. There is no limit to a maximum time required for the encoding, but the maximum should be 360° or less in rotating angle of the rotary drum 20 when taking into consideration the processing efficiency.

On the other hand, when considering the mechanical limitations, the phase difference between the signals to or from the heads 22 and 23 should be an odd number multiple of approximately 180° since the heads 22 and 23 are mounted at mutually opposing positions on the rotary drum 20. In other words, the phase difference between the heads 22 and 23 should be 180°, 540°, 900°, 1260°, 1620°, . . . .

Accordingly, the angle $\theta_T$ should be in a range of 540° to 1260° and be an odd number multiple of approximately 180°. Hence, the three cases shown in the following Table satisfy all of the above described conditions for the angle $\theta_T$. In other words, the angle $\theta T$ is $540° + 360° \times m$, where m=0, 1 or 2.

TABLE

| Time required | Case 1 | Case 2 | Case 3 |
|---|---|---|---|
| Decoding | 180° | 225° | 360° |
| Phase matching | 0° | 135° | 180° |
| Digitizing | 360° | 360° | 360° |
| Encoding | 0° | 180° | 360° |
| Total | 540° | 900° | 1260° |

In the present embodiment, the head 23 is mounted on the rotary drum 20 at the height position which is 2.5 track pitches (2.5P) higher than that of the head 22 so as to obtain a 900° rotating angle (that is, n=1) of the rotary drum 20 for $\theta_T$. A difference M in the height positions of the heads 22 and 23 may be described in track pitches as $M = (\theta_T/360°) \cdot P$.

An angle $\theta_c$ which describes the error $\Delta l$ in rotating angle of the rotary drum 20 may be described by the following equation, where R denotes the diameter of the rotary drum 20, N denotes the rotation frequency of the rotary drum 20 per unit time, $V_L$ denotes the transport speed of the tape 25, $\theta_0$ denotes the inclination angle of the track when the tape 25 is stationary, P denotes the track pitch, and M denotes the difference between the height positions of the heads 22 and 23.

$$\theta_c = \tan^{-1} (M \cdot P \cdot \tan(90° - v_r))/L_r]$$

In the above equation, $L_r$ and $\theta_r$ may be described by the following equations.

$$L_r = [(\pi R/2 \cdot \sin\theta_0)^2 + (\pi R/2 \cdot \cos\theta_0 - V_L/2N)^2]^{\frac{1}{2}}$$

$$\theta_r = \tan^{-1}[(\pi R/2 \cdot \sin\theta_0)/(\pi R/2 \cdot \cos\theta_0 - V_L/2N)]$$

In other words, it is possible to mechanically eliminate the error $\Delta l$ by setting the separating angle between the heads 22 and 23 on the rotational plane of the rotary drum 20 to $(180° + \theta_c)$. On the other hand, the error $\Delta l$ may also be eliminated electrically by providing a delay circuit for delaying the signal by a delay time corresponding to the angle $\theta_c$.

Figure 4:
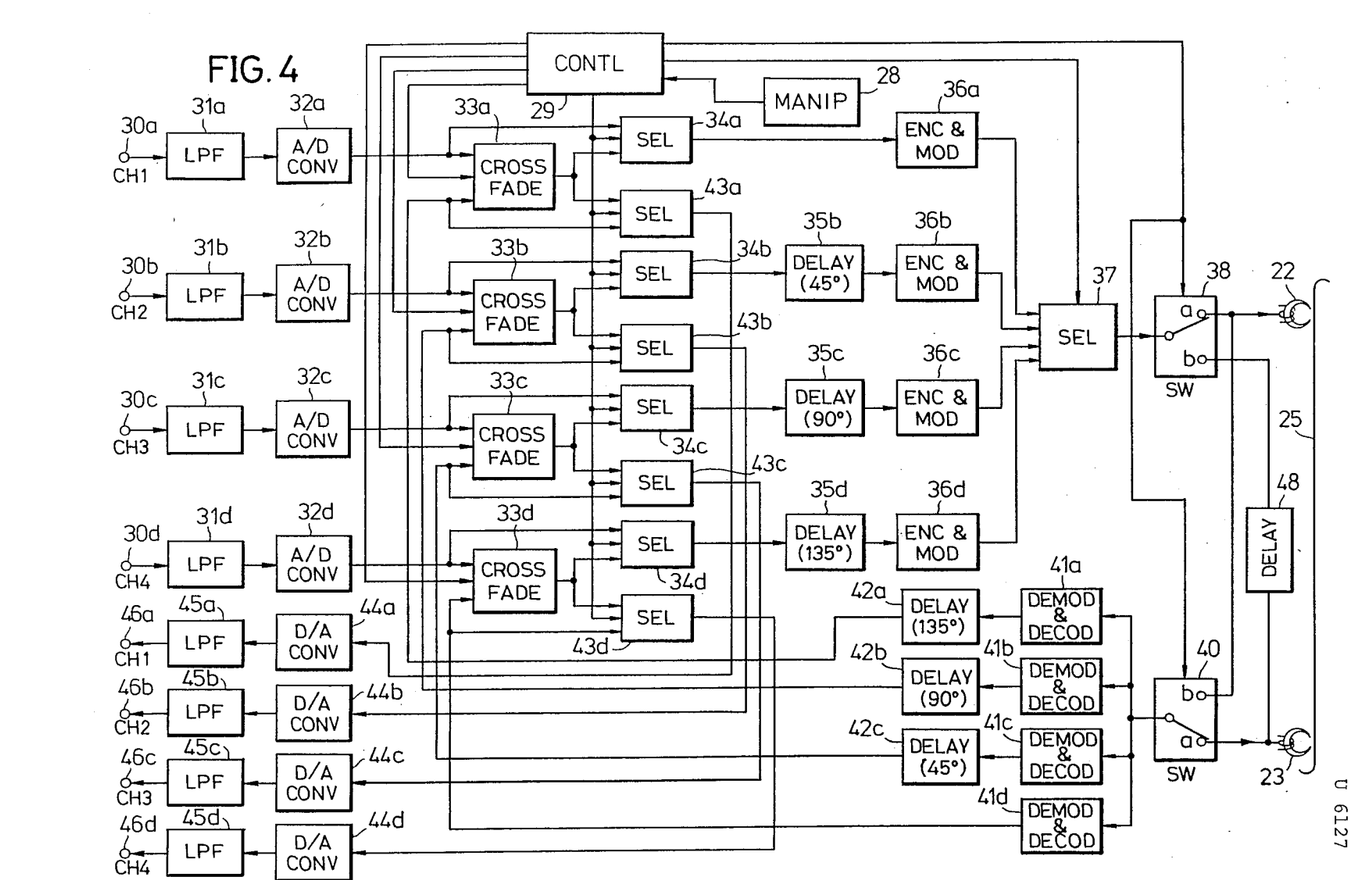
FIG. 4 is a system block diagram showing recording and reproducing systems of the first embodiment of the recording and reproducing apparatus according to the present invention.
Figure 5:
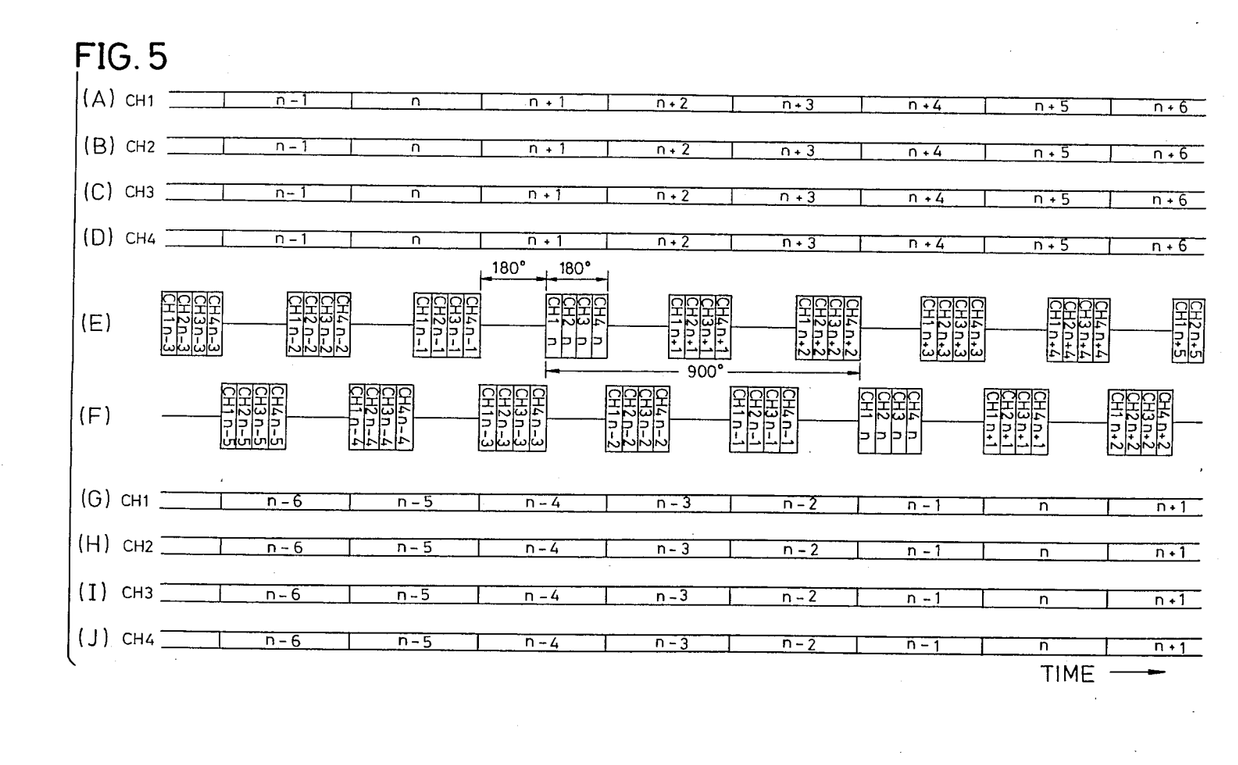

FIG. 4 shows the recording and reproducing systems of the first embodiment of the apparatus according to the present invention. An operator sets the apparatus to a desired operating mode by manipulating switches (not shown) of a manipulation part 28. When the manipulation part 28 is manipulated, a signal dependent on the set operating mode is supplied to a control circuit 29 which generates various control signals in accordance with the set operating mode.

Audio signals of first through fourth channels (CH1 through CH4) are respectively applied to terminals 30a through 30d. The audio signal in each channel is supplied to a corresponding one of lowpass filters 31a through 31d wherein an unwanted high frequency component is eliminated. Output signals of the lowpass filters 31a through 31d are converted into digital signals in analog-to-digital (A/D) converters 32a through 32d and are supplied to respective cross fade circuits 33a through 33d and respective selectors 34a through 34d. The selectors 34a through 34d are also supplied with output signals of the respective cross fade circuits 33a through 33d, but the selectors 34a through 34d are controlled responsive to a control signal from the control circuit 29 to selectively pass the output signals of the A/D converters 32a through 32d during a normal recording mode.

An output signal of the selector 34a is supplied directly to an encoding and modulating circuit 36a. On the other hand, output signals of the selectors 34b, 34c and 34d are supplied to encoding and modulating circuits 36b, 36c and 36d via respective delay circuits 35b, 35c and 35d. The delay circuits 35b, 35c and 35d respectively delay input signals thereof by delay times corresponding to 45°, 90° and 135° rotating angle of the rotary drum 20.

The encoding and modulating circuits 35a through 35d each add error detecting and correcting codes to the incoming digital audio signal, interleave the digital signal, modulate the digital signal according to a frequency modulation or modified frequency modulation, and supply a modulated signal to a selector 37. The time base is compressed when the encoding is carried out, and a transmission time of the modulated signal is ¼ the transmission time of the input analog audio signal or less. The selector 37 time-sequentially supplies to a selector 38 the modulated signals from the encoding and modulating circuits 36a through 36d responsive to a control signal from the control circui 29. During the normal recording mode, the selector 38 is connected to a terminal a responsive to a control signal from the control circuit 29. Hence, the modulated signal from the selector 37 is supplied to the head 22 via the selector 38 and is recorded on the tape 25.

The signal processings carried out in the encoding and modulating circuits 36a through 36d and the selector 37 are known, and description on the concrete circuit construction and operation thereof will be omitted.

The audio signals applied to the terminals 30a through 30d are shown schematically in FIGS. 5(A) through 5(D) by denoting the audio signals by rotation periods n−1, n, n+1, . . . of the rotary drum 20. Since the encoding in the encoding and modulaiing circuits 36a through 36d is carried out after the audio signal n is obtained, that is, when the audio signal n+1 is obtained, the audio signal n in each channel is recorded on the tape 25 after the rotary drum 20 rotates 180° from the time when the audio signal n+1 is obtained, as shown in FIG. 5(E). When it is assumed that the modulated signals of the audio signals n are recorded on the track $t_n$ shown in FIG. 3, the head 23 scans the track $t_n$ after the rotary drum 20 undergoes 2.5 revolutions (=900°), and the modulated signals of the audio signals n are reproduced with a timing shown in FIG. 5(F). The reproduced modulated signal is supplied to demodulating and decoding circuits 41a through 41d via a selector 40 shown in FIG. 4 which is connected to a terminal a in the normal recording mode responsive to the control signal from the control circuit 29.

The demodulating and decoding circuits 41a through 41d each demodulate the modulated signal of the corresponding one of the first through fourth channels, de-interleave the demodulated signal, carry out error detection and correction, and produce a digital signal of one channel in which the time base is expanded back into the original time base. Output signals of the demodulating and decoding circuits 41a, 41b and 41c are respectively delayed by delay times corresponding to 135°, 90° and 45° rotating angle of the rotary drum 20 in delay circuits 42a, 42b and 42c, so as to match the timings of the signals with respect to an output signal of the demodulating and decoding circuit 41d.

The signal processings carried out in the demodulating and decoding circuits 41a through 41d are known, and description on the concrete circuit construction and operation thereof will be omitted.

The digital signals of the first through fourth channels the timings of which are matched are supplied to the cross fade circuits 33a through 33d and selectors 43a through 43d. The selectors 43a through 43d are also supplied with the output signals of the cross fade circuits 33a through 33d, but the selectors 43a through 43d are controlled responsive to the control signal from the control circuit 29 to selectively pass the output signals of the delay circuits 42a through 42c and the output signal of the demodulating and decoding circuit 41d during the normal recording mode. The digital signals from the selectors 43a through 43d are converted into analog signals in digital-to-analog (D/A) converters 44a through 44d, and lowpass filters 45a through 45d eliminate an unwanted high frequency component in the analog audio signals from the D/A converters 44a through 44d. As a result, the audio signals of the first through fourth channels shown in FIGS. 5(G) through 5(J) are obtained from respective terminals 46a through 46d.

Next, description will be given with respect to punch in/out operations in which a predetermined section of the audio signals of the first and third channels out of the first through fourth channels is replaced by different audio signals. In this case, the operator manipulates the manipulation part 28 to instruct the punch in/out operations in which the predetermined section of the audio signals of the first and third channels are replaced by the different audio signals.

During an insert recording mode in which an operation such as the punch in/out operations are carried out, the selector 38 is connected to a terminal b responsive to a control signal from the control circuit 29. The selectors 34a through 34d and the selectors 43a through 43d are controlled responsive to a control signal from the control circuit 29 to selectively pass the output signals of the cross fade circuits 33a through 33d. A modulated signal shown in FIG. 6(A) which is reproduced from the tape 25 by the head 22 is demodulated and decoded, and audio signals shown in FIGS. 6(B) through 6(E) are obtained from the respective terminals 46a through 46d. The digital signals from the delay circuits 42a through 42c and the demodulating and decoding circuit 41d are supplied to the respective cross fade circuits 33a through 33d. In this state, audio signals shown in FIGS. 6(F) through 6(I) are applied to the terminals 30a through 30d.

The cross fade circuits 33a through 33d multiply a coefficient $\alpha$ to the source signals from the A/D converters 32a through 32d, multiply a coefficient $(1-\alpha)$ to the reproduced signals from the delay circuits 42a through 42c and the demodulating and decoding circuit 41d, and produce added signals obtained by adding the two signals which are supplied thereto and are multiplied by the coefficients, where $0 \leq \alpha \leq 1$. At a time when the audio signals n−2 are applied to the terminals 30a through 30d, the coefficient $\alpha$ in the cross fade circiits 33a through 33d are set to "0" responsive to control signals from the control circuit 29. When the audio signals n−1 are obtained, the coefficient $\alpha$ in the cross fade circuits 33a and 33c are gradually changed from "0" to "1" responsive to the control signals from the control circuit 29, and furthermore, the coefficient $\alpha$ in the cross fade circuits 33a and 33c are gradually changed from "1" to "0" responsive to the control signals from the control circuit 29 when the audio signals n+2 are obtained. The coefficient $\alpha$ in the other cross fade circuits 33b and 33d is maintained to "0" responsive to the control signals from the control circuit 29. Accordingly, digital signals shown in FIGS. 6(J) through 6(M) are supplied to the encoding and modulating circuits 36a through 36d, and a portion of the audio signals n−1 and n+2 of the first and third channels and the audio signals n and n+1 of the first and third channels are replaced by the source signals, that is, the audio signals from the terminals 30a and 30c.

Known cross fade circuits may be used for the cross fade circuits 33a through 33d, and description on the concrete circuit construction and operation thereof will be omitted.

Figure 6:
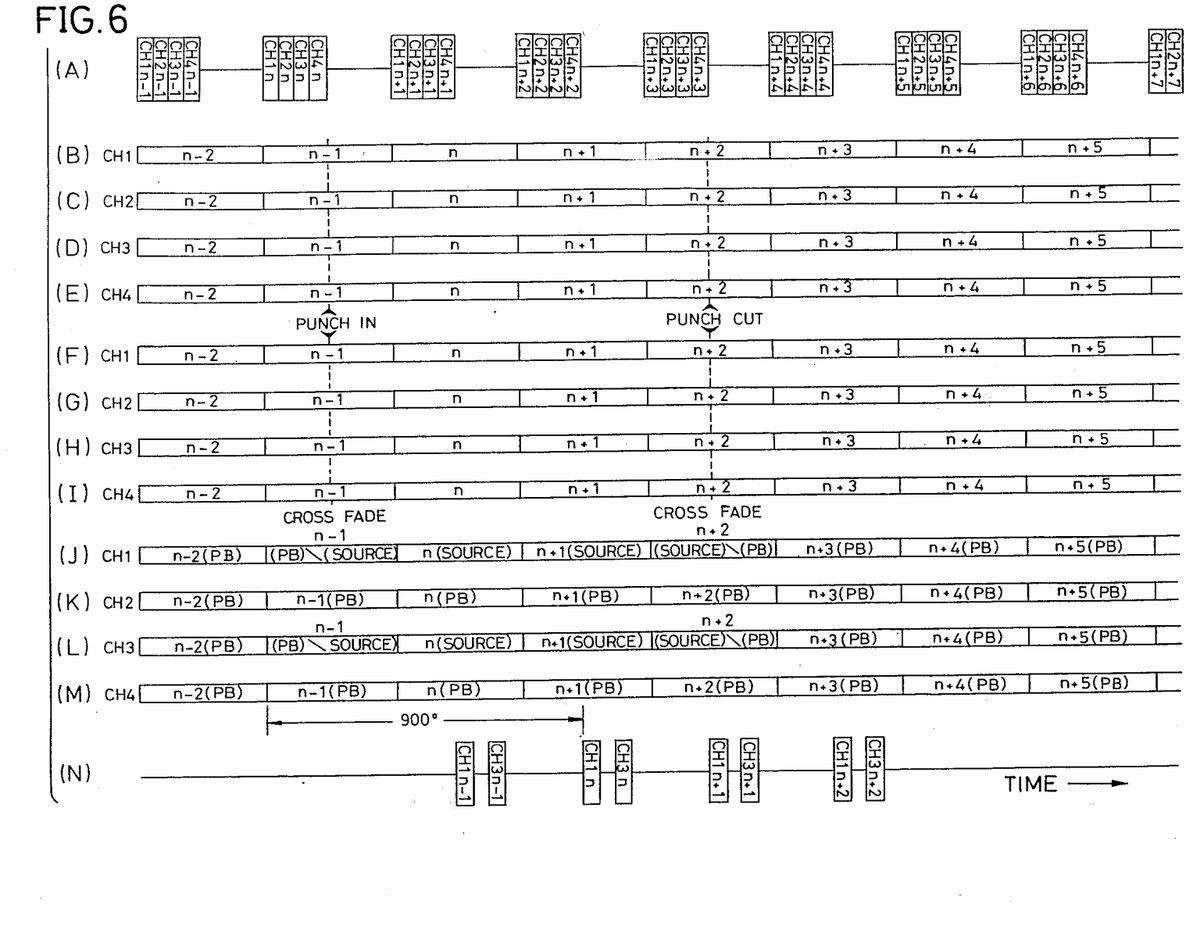
FIGS. 6(A) through 6(N) are timing charts for explaining the operation of the apparatus shown in FIG. 4 during an insert recording mode.

The selector 37 produces the modulated signals of the signals n−1 to n+2 of the first and third channels as shown in FIG. 6(N) responsive to the control signal from the control circuit 29. These modulated signals are supplied to the head 23 via a delay circuit 48 and are recorded on the tape 25. The delay circuit 48 has a delay time corresponding to the angle $\theta_c$ described before. The recorded signals on the tape 25 are substantially erased by the new recording.

The punch in/out operations are carried out in this manner. A synchronized recording in which an audio signal is recorded in the second channel wiile listening to a different audio signal reproduced in the first channel, for example, may be carried out similarly by carrying out a recording by the head 23 while carrying out a reproduction by the head 22. Furthermore, a pingpong operation may be carried out similarly by recording by the head 23 in the second channel an audio signal which is reproduced from the first channel by the head 22.

Figure 7:
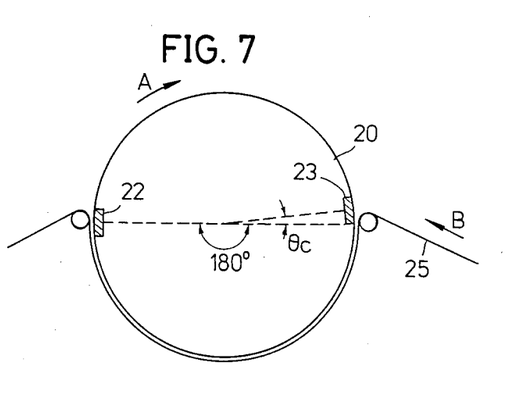
FIG. 7 is a plan view showing a drum portion of a second embodiment of the recording and reproducing apparatus according to the present invention.

In the first embodiment, the heads 22 and 23 are separated by 180° on the rotational plane of the rotary drum 20, and for this reason, the error Δl described before is compensated electrically by the delay circuit 48 shown in FIG. 4. However, the heads 22 and 23 may be separated by 180°+$\theta_c$ on the rotational plane of the rotary drum 20 as in the case of a second embodiment of the recording and reproducing apparatus shown in FIG. 7. In FIG. 7, those parts which are the same as those corresponding parts in FIG. 2A are designated by the same reference numerals, and description thereof will be omitted. In the present embodiment, the delay circuit 48 shown in FIG. 4 may be omitted because the error Δl is compensated mechanically. Other parts of the recording and reproducing systems of the present embodiment are the same as those of the first embodiment, and the illustration and description thereof will be omitted.

In the embodiments described heretofore, two heads 22 and 23 are used, and two rotary transformers (not shown) are used to transmit the modulated signal between the rotary drum 20 and the stationary drum 21. However, when the time period in which the modulated signal is recorded on (and reproduced from) the tape 25 corresponds to less than −180° rotating angle of the rotary drum 20 such as 170°, for example, only one rotary transformer is necessary since the heads 22 and 23 are separated by approximately 180° on the rotational plane of the rotary drum 20.

In addition, the recording (or reproduction) carried out by the head 22 and the reproduction (or recording) carried out by the head 23 do not overlap each other in time. For this reason, no crosstalk is generated between the modulated signal which is recorded and the modulated signal which is reproduced, and the construction of the rotary drum 20 is simple because there is no need to provide a pre-amplifier in the rotary drum 20 for amplifying the reproduced modulated signal.

The information signal which is to be recorded and reproduced is not limited to an audio signal, and the number of channels is not limited to four.

As described heretofore, according to the present invention, it is possible to carry out an insert recording or the like when recording and reproducing a digital information signal because a trailing head scans a track a predetermined time after the track is scanned by a leading head, where the predetermined time is sufficient to subject the signal reproduced by the leading head to a predetermined digital signal processing before recording the processed signal by the trailing head.

Further, the present invention is not limited to these embodiments, but various variations and modifications may be made without departing from the scope of the present invention.

What is claimed is:

1. A helical scan type magnetic recording and reproducing apparatus for recording and reproducing a digital information signal on and from tracks of a magnetic tape, said tracks being formed obliquely to a longitudinal direction of the magnetic tape, said helical scan type magnetic recording and reproducing apparatus comprising:
   a drum assembly comprising a stationary drum and a rotary drum, said rotary drum rotating at a predetermined rotational speed so that a rotating angle of said rotary drum corresponds to a time period;
   first and second rotary magnetic heads mounted on the rotary drum at positions having an angular separation of approximately 180° on a rotating plane of the rotary drum and having a predetermined separation along an axial direction of the rotary drum so that said second rotary magnetic head scans a predetermined track position on the magnetic tape a predetermined time after said first rotary magnetic head scans said predetermined track position;
   first signal processing means for subjecting a digital signal which is to be recorded by one of said first and second rotary magnetic heads to a predetermined digital signal processing including an encoding process; and
   second signal processing means for subjecting a digital signal which is reproduced by the other of said first and second rotary magnetic heads to a predetermined digital signal processing including a decoding process,
   said predetermined time being longer than a maximum time required to carry out the digital signal processings in said first and second signal processing means and corresponding to a predetermined rotating angle $\theta_T$ of the rotary drum, where $\theta_T = 540° + 360° \times m$ and m=0, 1 or 2,
   said predetermined separation being set to $(\theta_T/360°)\cdot P$ in track pitch P, said track pitch P being a distance between center lines of two mutually adjacent tracks on the magnetic tape.

2. A helical scan type magnetic recording and reproducing apparatus as claimed in claim 1 in which said second rotary magnetic head reproduces a digital signal from a specific track on the magnetic tape for monitoring purposes said predetermined time after said first rotary magnetic head records the digital signal on said specific track in a normal recording mode.

3. A helical scan type magnetic recording and reproducing apparatus as claimed in claim 1 in which said second rotary magnetic head records a new digital signal on a specific track on the magnetic tape said predetermined time after said first rotary magnetic head reproduces a recorded digital signal from said specific track in an insert recording mode.

4. A helical scan type magnetic recording and reproducing apparatus as claimed in claim 3 in which said new digital signal is obtained by processing the digital signal which is reproduced from said specific track by said first rotary magnetic head in said second and first signal processing means.

5. A helical scan type magnetic recording and reproducing apparatus as claimed in claim 3 in which said first and second rotary magnetic heads have an angular separation of exactly 180° on the rotational plane of the rotary drum, said helical scan type magnetic recording and reproducing apparatus further comprising means for delaying said new digital signal by a certain delay time so as to electrically compensate for an error between a position where said first rotary magnetic head starts to scan said specific track and a position where said second rotary magnetic head starts to scan said specific track.

6. A helical scan type magnetic recording and reproducing apparatus as claimed in claim 3 in which said first and second rotary magnetic heads have an angular separation of 180°+$\theta_c$ to mechanically eliminate an error between a position where said first rotary magnetic head starts to scan said specific track and a position where said second rotary magnetic head starts to scan said specific track, where $\theta_c$ is described by $$\theta_c = \tan^{-1}[(M \cdot P \cdot \tan(90° - \theta_r))/L_r],$$

where

M denotes said predetermined separation, $$L_r = [(\pi R/2 \cdot \sin \theta_0)^2 + (\pi R/2 \cdot \cos \theta_0 - V_L/2N)^2]^{\frac{1}{2}}$$
$$\theta_r = \tan^{-1}[(\pi R/2 \cdot \sin \theta_0)/(\pi R/2 \cdot \cos \theta_0 - V_L/2N)],$$

R denoting a diameter of the rotary drum, $\theta_0$ denoting an inclination angle of the tracks with respect to the longitudinal direction of the magnetic tape, and $V_L$ denoting a transport speed of the magnetic tape.

* * * * *